(12) United States Patent
Egedal

(10) Patent No.: US 11,988,194 B2
(45) Date of Patent: May 21, 2024

(54) DETECTING A WIND TURBINE ROTOR BLADE ADJUSTMENT FAULT

(71) Applicant: Siemens Gamesa Renewable Energy A/S, Brande (DK)

(72) Inventor: Per Egedal, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 304 days.

(21) Appl. No.: 17/299,544

(22) PCT Filed: Oct. 31, 2019

(86) PCT No.: PCT/EP2019/079834
§ 371 (c)(1),
(2) Date: Jun. 3, 2021

(87) PCT Pub. No.: WO2020/120016
PCT Pub. Date: Jun. 18, 2020

(65) Prior Publication Data
US 2022/0025853 A1  Jan. 27, 2022

(30) Foreign Application Priority Data
Dec. 13, 2018 (EP) .................................. 18212373

(51) Int. Cl.
*F03D 7/02* (2006.01)
*F03D 17/00* (2016.01)

(52) U.S. Cl.
CPC ......... *F03D 7/0224* (2013.01); *F03D 7/0232* (2013.01); *F03D 7/0244* (2013.01);
(Continued)

(58) Field of Classification Search
CPC .... F03D 7/0224; F03D 7/0232; F03D 7/0244; F03D 7/0276; F03D 7/0252; F03D 17/00;
(Continued)

(56) References Cited

U.S. PATENT DOCUMENTS 5,106,265 A    4/1992  Holzem
7,293,959 B2 * 11/2007 Pedersen ............... F03D 7/0232
                                                    416/41
(Continued)

FOREIGN PATENT DOCUMENTS

CN      101749184 A      6/2010
CN      106795857 A      5/2017
(Continued)

OTHER PUBLICATIONS

International Search Report and Written Opinion in corresponding PCT Patent Application No. PCT/EP2019/079834 dated Jan. 21, 2020. 12 pages.
(Continued)

*Primary Examiner* — Brian P Wolcott
(74) *Attorney, Agent, or Firm* — Schmeiser, Olsen & Watts LLP

(57) ABSTRACT

A method of detecting an adjustment fault related to a wind turbine rotor blade mounted at a wind turbine rotor and including an adaptable flow regulating device, in particular spoiler and/or flap, the method including: estimating a quantity indicative of a change of a driving impact of wind on the wind turbine rotor based on at least two settings of the adaptable flow regulating device; determining another quantity indicative of a desired change of the driving impact on the wind turbine rotor, in order to change a value of a rotor speed to a reference value of the rotor speed; and indicating an adjustment fault based on a comparison of the quantity with the other quantity, is provided.

16 Claims, 2 Drawing Sheets

Figure 1:
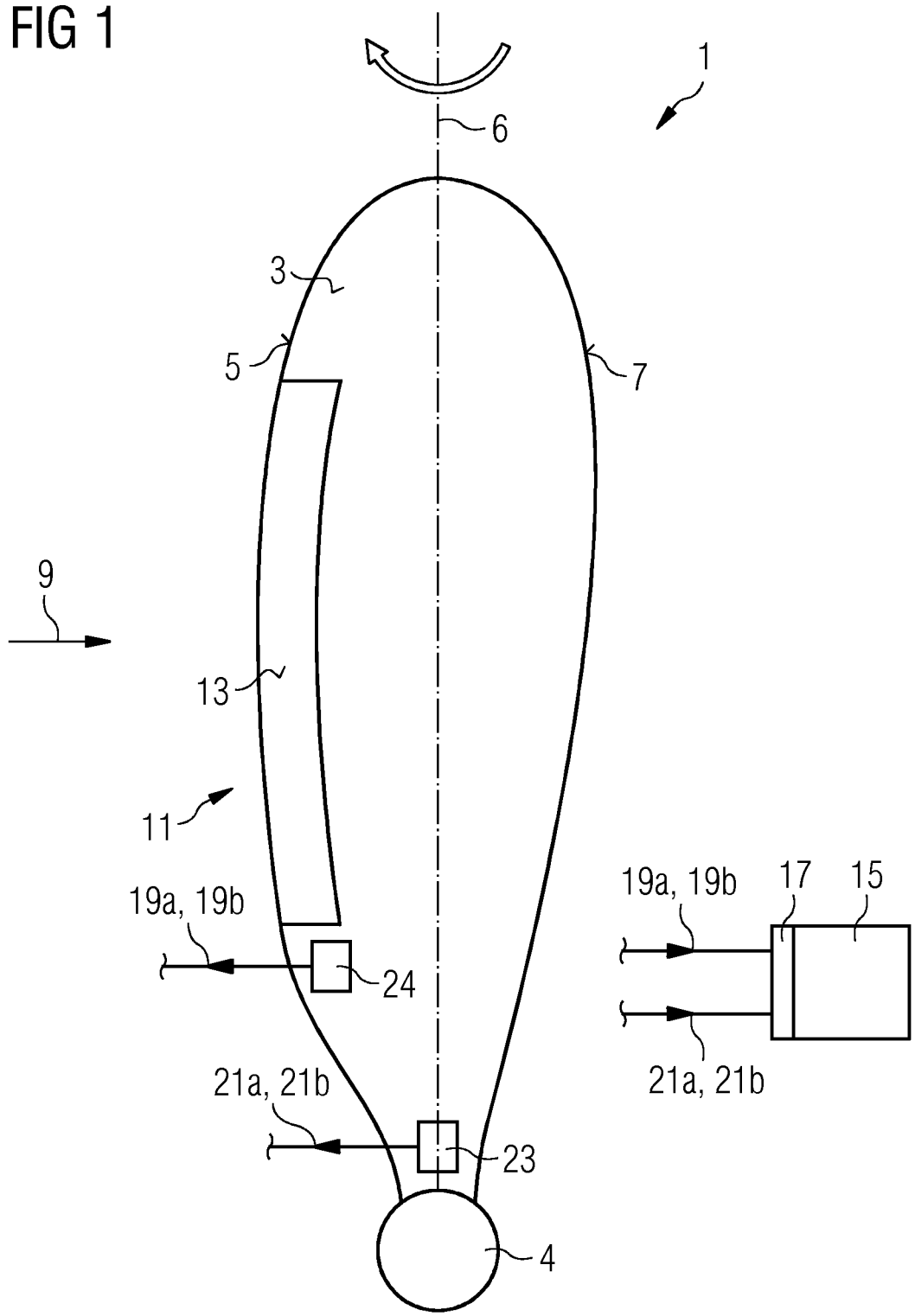

(52) U.S. Cl.
CPC ........... *F03D 7/0276* (2013.01); *F03D 17/00* (2016.05); *F05B 2240/3052* (2020.08); *F05B 2260/80* (2013.01); *F05B 2260/84* (2013.01); *F05B 2270/101* (2013.01); *F05B 2270/327* (2013.01); *F05B 2270/335* (2013.01)

(58) Field of Classification Search
CPC .............. F05B 2260/80; F05B 2260/84; F05B 2270/101; F05B 2270/309; F05B 2270/327; F05B 2270/335
See application file for complete search history.

(56) References Cited

U.S. PATENT DOCUMENTS

| | | | |
|---|---|---|---|
| 8,192,161 B2 * | 6/2012 | Baker .................... | F03D 1/0641 416/23 |
| 8,210,469 B2 * | 7/2012 | Nitzsche ............... | B64C 27/605 244/17.11 |
| 8,324,749 B2 * | 12/2012 | Minami ................ | F03D 7/0224 290/55 |
| 8,851,840 B2 | 10/2014 | Hancock et al. | |
| 9,752,561 B2 * | 9/2017 | Egedal .................. | F03D 7/0224 |
| 10,570,881 B2 * | 2/2020 | Egedal .................. | F03D 7/0228 |
| 10,968,888 B2 * | 4/2021 | Christensen .......... | F03D 7/0232 |
| 11,078,885 B2 * | 8/2021 | Akay .................... | F03D 7/0232 |
| 2010/0140941 A1 | 6/2010 | Egedal et al. | |
| 2012/0134803 A1 | 5/2012 | McGrath et al. | |
| 2015/0176570 A1 | 6/2015 | Egedal et al. | |
| 2016/0076517 A1 * | 3/2016 | Butterworth ............ | F03D 7/044 700/275 |
| 2017/0241404 A1 | 8/2017 | Kristoffersen | |
| 2018/0335018 A1 * | 11/2018 | Cao .................... | G05B 23/0286 |
| 2022/0025853 A1 | 1/2022 | Egedal | |

FOREIGN PATENT DOCUMENTS

| | | |
|---|---|---|
| DE | 102011112732 A1 | 3/2013 |
| EP | 1623111 A1 | 2/2006 |
| EP | 2886856 A1 | 6/2015 |
| WO | 2018041420 A1 | 3/2018 |

OTHER PUBLICATIONS

Extended European Search Report in corresponding European Patent Application No. 18212373.7 dated Jul. 2, 2019. 6 pages.

* cited by examiner

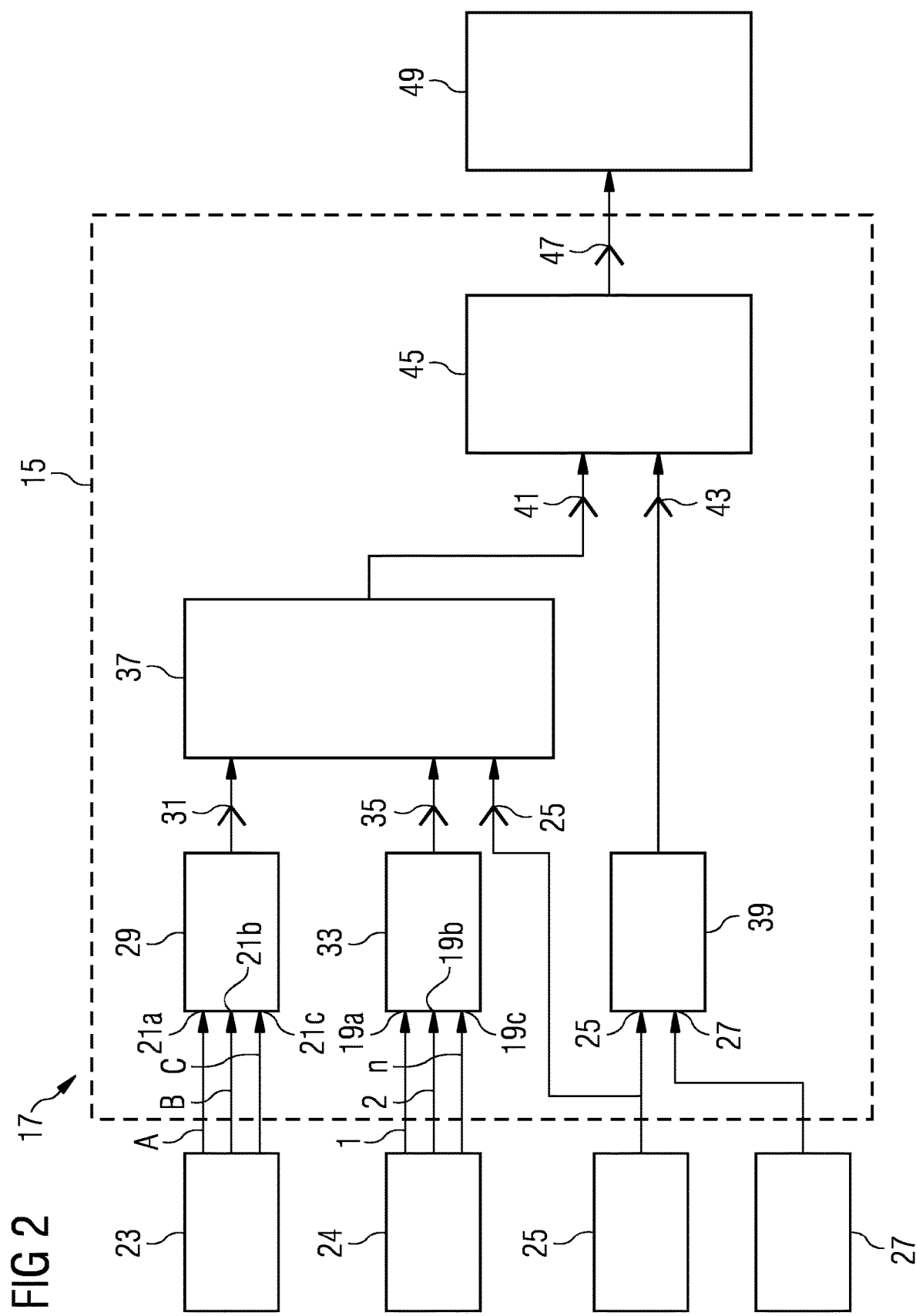

DETECTING A WIND TURBINE ROTOR BLADE ADJUSTMENT FAULT

CROSS-REFERENCE TO RELATED APPLICATIONS

This application is a national stage entry of PCT Application No. PCT/EP2019/079834 having a filing date of Oct. 31, 2019, which claims priority to European Patent Application No. 18212373.7, having a filing date of Dec. 13, 2018, the entire contents of which are hereby incorporated by reference.

FIELD OF TECHNOLOGY

An aspect of the present invention relates to a method and to an arrangement of detecting an adjustment fault related to a wind turbine rotor blade mounted at a wind turbine rotor and comprising an adaptable flow regulating device, in particular a spoiler and/or a flap. Further, the present invention relates to a wind turbine rotor blade comprising the arrangement and further relates to a wind turbine comprising the wind turbine rotor blade.

BACKGROUND

A wind turbine rotor blade may have installed a flow regulating device on its surface. An example of such a flow regulating device is a spoiler installed at the rotor blade surface. The spoiler may act in concert with a vortex generator and may influence the effect of the vortex generator depending on the state of the spoiler. The state of the spoiler may relate to a protrusion height and/or tilt angle by which the spoiler extends from or is angularly tilted relative to other surface portions of the rotor blade. In general, a flow regulating device may be considered to comprise a device which is capable of, in certain conditions, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

Conventionally, an adaptable flow regulating device, such as a spoiler or a flap, which is mounted on a rotor blade surface or at a rotor blade surface, may be prone to an adjustment fault, either due to a controller fault and/or due to an actuator fault which is intended to set the adaptable flow regulating device in two or more different activation states. If such an adjustment fault occurs, the wind turbine rotor blade and also further components of the wind turbine may be subjected to excessive load. In particular, an actuator runaway (due to controller and/or actuator failure or fault) may cause excessive overspeed and may result in excessive loads if the runaway is not detected fast enough.

However, conventionally, fault detection of an adjustment fault of an adaptable flow regulating device has not been properly addressed.

Thus, there may be a need for a method of detecting an adjustment fault related to a wind turbine rotor blade mounted at a wind turbine rotor and comprising an adaptable flow regulating device and there may be a need for a corresponding arrangement, a wind turbine rotor blade and a wind turbine, wherein an adjustment fault can reliably and securely be detected, enabling to react in appropriate manner to set the wind turbine in a safe operational mode or to shut down the wind turbine in a secure manner.

SUMMARY

According to an embodiment of the present invention it is provided a method of detecting an adjustment fault related to a wind turbine rotor blade mounted at a wind turbine rotor and comprising an adaptable flow regulating device, in particular spoiler and/or flap, the method comprising: estimating a quantity indicative of a change of a driving impact of wind on the wind turbine rotor based on at least two settings of the adaptable flow regulating device; determining another quantity indicative of a required (or desired, or needed) change of the driving impact on the wind turbine rotor (e.g. a needed rotor torque change), in order to change a value of a rotor speed to a reference value of the rotor speed; and indicating an adjustment fault based on a comparison of the quantity with the other quantity.

Upon detection of such an adjustment fault, countermeasures can be taken or a safe stop procedure may be initiated.

The wind turbine rotor blade, may be equipped with so-called active add-on, i.e. adaptable flow regulating devices, which may be set in different states or settings corresponding to different effects on an air flow close to at or at the rotor blade surface. The active add-on may be set into different states using one or more actuators, e.g. using an expandable device, such as a hose or a bag, which may be filled with compressed air to a different degree or different filling level in order to set the adaptable flow regulating device in two or more different settings.

The method may for example be performed by a wind turbine controller or a wind park controller. The method may be implemented partly in software and/or hardware. In particular, the method of detecting the adjustment fault may be performed to be completely independent of any controller processes or actuator processes involved in adjusting the wind turbine rotor blade, in particular adjusting a pitch angle and/or adjusting a setting of the adaptable flow regulating device.

The adjustment fault may relate to a fault of a controller (and/or sensor) controlling for example a state of the flow regulating device and/or a controller of controlling the pitch mechanism of the rotor blade. Alternatively or additionally, the adjustment fault may relate to a failure or fault of an actuator (and/or associated sensor) which actuates for example the adaptable flow regulating device and/or an actuator which actuates the blade pitch system in order to set the rotor blade to a particular pitch angle.

The method may identify a situation, in which successive settings of the flow regulating device do for example not result in a driving impact on the rotor of the wind turbine which will change the actual value of the rotor speed to the reference value of the rotor speed, which may be the desired value of the rotor speed. The adjustment fault may in particular comprise an adjustment fault of the adaptable flow regulating device and/or an adjustment fault of the blade pitch.

The adaptable flow regulating device may be mounted on or at the rotor blade surface, in particular a leading edge at a suction surface of the rotor blade, in particular if the adaptable flow regulating device comprises a spoiler. The wind turbine rotor blade may comprise one or more adaptable flow regulating device, for example mounted at different locations of the rotor blade surface. In particular, the rotor blade may comprise further flow regulating devices which may not necessarily be adaptable, such as at least one vortex generator, in particular installed downstream the adaptable flow regulating device and which may be effectively turned on or off depending for example on the state of the adaptable flow regulating device, in particular spoiler, installed upstream of the vortex generator. In particular, the adaptable flow regulating device and/or the vortex generator may be configured in a number or plural modules arranged along a longitudinal direction of the rotor blade. A flap (another example of an adaptable flow regulating device) may be installed for example at a trailing edge of the rotor blade, in particular at a suction side.

The method may for example be carried out during normal operation of the wind turbine, involving rotation of the rotor at which the wind turbine rotor blade is mounted. The wind may impact on portions of the rotor blade as well as on an airfoil shaped surface of the adaptable flow regulating device. The airfoil shaped surface of the adaptable flow regulating device may be set in different orientations and/or positions for different states or settings of the adaptable flow regulating device. Thus, the two settings of the adaptable flow regulating device may result in two different driving impacts of the wind on the wind turbine rotor.

The driving impact may be understood as corresponding to a force or a torque exerted on the wind turbine rotor. Thus, for example the quantity may be indicative of the torque exerted on the rotor. However, the quantity may not necessarily be the torque. The change of the driving impact may relate to a temporal change of the driving impact, in particular to a temporal change of the torque acting on the wind turbine rotor. Each of the two settings of the adaptable flow regulating device may result in a particular driving impact, in particular the two settings of the adaptable flow regulating device may result in two different driving impacts on the wind turbine rotor. The change of the driving impact may for example be determined as a difference between the driving impact for the first setting and the driving impact for the second setting. From the quantity, the torque change may be derivable. For example, the torque change may be proportional to the quantity.

Similarly, the other quantity may be proportional to a required or desired or needed torque in order to change the (actual) value of the rotor speed to the reference value. For estimating the quantity, other values of parameters may be considered beyond the at least two settings of the adaptable flow regulating device, for example operational parameters of the wind turbine, in particular including blade pitch settings. In particular, any setting of any device installed at the wind turbine rotor blade which affects or influences the driving impact of the wind on the wind turbine rotor may be taken into account to estimate the quantity.

The reference value of the rotor speed may be a predetermined value, for example may be the nominal rotor speed which is to be reached for normal operation of the wind turbine. However, the method may also be performed when the wind turbine is not operating in a normal operational mode, but when for example the reference value of the rotor speed is different from a nominal rotor speed. The reference value of the rotor speed may relate to or may be equal to a desired rotor speed of the rotor.

During normal operation in which no adjustment fault occurs, the adaptable flow regulating device is expected to be controlled and then set in order to adjust or change the actual rotor speed towards the reference value of the rotor speed. For this purpose, the controller of the adaptable flow regulating device may be designed. Also for this purpose, an actuator setting the state of the adaptable flow regulating device (which may be coupled to the respective controller) is designed. Thus, in an adjustment fault-free situation, the adjustment of the adaptable flow regulating device may be such, that the value of the rotor speed is changed towards the reference value of the rotor speed, thus to reach the reference value of the rotor speed.

For changing the actual value of the rotor speed to the (desired) reference value of the rotor speed, a particular torque may be required or needed which may be determined by the method. In particular, the other quantity may relate to or may be equal to the torque needed in order to adjust the actual value of the rotor speed to the reference value of the rotor speed. In other embodiments, the other quantity may be different from the actual needed torque but may be for example proportional to the needed torque.

Furthermore, for example, the moment of inertia of the rotating system, including the rotor and the rotor blades, may be taken into account in order to determine the other quantity indicative of a required or needed or desired change of the driving impact.

The at least two settings of the adaptable flow regulating device may relate or may be equal to the actually present settings of the adaptable flow regulating device, they may for example be measured, for example including pressure in an expandable device and/or protrusion height and/or orientation and/or position of an airfoil shaped surface of the flow regulating device which is exposed to the air flow.

If, for example, a deviation between the quantity and the other quantity is relatively small, for example smaller than a quantity threshold, it may be inferred that no adjustment fault is present. If the quantity and the other quantity deviate from each other, for example more than a quantity threshold, it may be concluded or inferred that an adjustment fault is present. The method may or may not distinguish between an adjustment fault relating to a blade pitch system or a flow regulating device. Advantageously, when the at least two settings of the adaptable flow regulating device are considered, in particular an adjustment fault of the adaptable flow regulating device (for example due to a controller fault and/or an actuator fault and/or sensor fault) may be identified. Afterwards, the wind turbine and/or the wind turbine rotor blade may be set into a safe operational mode or parameter setting.

According to an embodiment of the present invention, estimating the quantity indicative of the change of driving impact on the wind turbine rotor is further based on at least two settings of a blade pitch of the rotor blade, and/or wherein the quantity and/or the other quantity comprises a rotor torque.

Also the settings of the blade pitch influence the change of the driving impact of the wind onto the rotor. Also the blade pitch adjustment system may be faulty (due to controller fault and/or actuator fault and/or sensor fault) which fault may be required also to be detected, in order to avoid damage of wind turbine components.

Each rotor blade of the wind turbine may independently be monitored for a fault of the adaptable flow regulating device and/or the fault of the blade pitch system. Thereby, risk of damage may further be reduced.

According to an embodiment of the present invention, the comparison of the quantity with the other quantity includes determining a quantity difference between the quantity and the other quantity. The quantity difference may for example be a torque difference or may be a value which is for example proportional to a torque difference. Thereby, the method may further be simplified.

According to an embodiment of the present invention, the adjustment fault is indicated, if an absolute value of the quantity difference exceeds a quantity threshold and/or if a sum of an absolute value of the quantity difference accumulated over a time interval exceeding a quantity threshold exceeds another quantity threshold.

If the absolute value of the quantity difference exceeds a quantity threshold, it may indicate that the setting of the flow regulating device and/or the setting of the blade pitch is not in the direction or in this magnitude as is required or needed or desired in order to change the rotor speed towards the reference rotor speed. The required need of change might be based on a model of the controller, which uses actual speed and speed reference as inputs and outputs a torque difference. Thus, in this situation, some adjustment fault is present.

According to an embodiment of the present invention, estimating the quantity comprises: modelling the air flow close to and/or at the rotor blade based on rotor speed for the at least two respective settings of the adaptable flow regulating device and the blade pitch; deriving, based on the air flow for the different settings, aerodynamic impact, in particular torque, acting on the rotor blade for the different settings.

The modelling may include to utilize or set up a physical/mathematical model simulating air flow across surfaces of the wind turbine blade and/or active surfaces of the flow regulating device(s). Thereby, the geometry of relevant air flow exposed surfaces may be taken into account as well as moments of inertia of the rotor. Furthermore, wind speed, wind direction, wind turbulence may be taken into account. Also for determining the other quantity, air flow modelling may be employed.

According to an embodiment of the present invention, determining the other quantity is based on the value of the rotor speed and the rotor speed reference value. Further, the other quantity may be dependent on the moment of inertia of the rotor. Thereby, the other quantity may simply be determined.

According to an embodiment of the present invention, the method further comprises measuring the at least two settings of the adaptable flow regulating device at a first and a second time point and determining a difference between the two settings; and/or measuring the at least two settings of the blade pitch at the first and second time points and determining a difference between the two settings; and/or measuring the value of the rotor speed.

For example, the pitch angle(s) may be measured using sensors, such as encoders. The setting of the flow regulating device may for example be measured optically or by determining a pressure in an expandable container which actuates on the airfoil shaped surface of the flow regulating device, in particular spoiler. Thereby, the method may rely on the actual physical configuration or constitution of the flow regulating device and/or the blade pitch. Thereby, estimating the quantity may be improved regarding accuracy.

According to an embodiment of the present invention, the two settings of the adaptable flow regulating device each indicates respective protrusion height and/or orientation and/or tilt of a airfoil shaped surface of the flow regulating device exposed to an air flow.

The airfoil shaped surface may in a normal operation be exposed to the air flow and may deflect the air flow or change the air flow compared to the air flow which would be present or which would evolve at the bare rotor blade surface. If the geometry and/or the orientation and/or position of the airfoil shaped surface is taken into account, estimating the quantity may be performed more accurately.

According to an embodiment of the present invention, the two settings of adaptable flow regulating device correspond to two states of adaptable flow regulating device that differ in an effect on air flow. The flow regulating device may comprise more than two states which all may differ regarding influence on the air flow. In a simple implementation, the flow regulating device has (for each device module) only an on state and an off state.

According to an embodiment of the present invention, the adaptable flow regulating device comprises plural adaptable flow regulating device modules mounted at the rotor blade which are independently settable in respective module states, each of the at least two settings of the adaptable flow regulating device comprising information regarding all module states. Thereby, manufacturing and/or transport of the flow regulating device may be simplified and also the mounting may be simplified. Furthermore, conventional designs may be supported.

According to an embodiment of the present invention, the method further comprises, after indicating the adjustment fault triggering a safe stop function of the flow regulating device and/or the blade pitch system, in particular for stopping the wind turbine. Thereby, damages to components of the wind turbine may be avoided.

It should be understood, that features, individually or in any combination, disclosed, described, explained or employed to a method of detecting an adjustment fault related to a wind turbine rotor blade mounted at a wind turbine rotor and comprising an adaptable flow regulating device may also, individually or in any combination, be applied or related to an arrangement for detecting an adjustment fault related to a wind turbine rotor blade mounted at a wind turbine rotor and comprises an adaptable flow regulating device according to embodiments of the present invention and vice versa.

According to an embodiment of the present invention it is provided an arrangement for detecting an adjustment fault related to a wind turbine rotor blade mounted at a wind turbine rotor and comprising an adaptable flow regulating device, the arrangement comprising a processor adapted: to estimate a quantity indicative of a change of a driving impact of wind on the wind turbine rotor based on at least two settings of the adaptable flow regulating device; to determine another quantity indicative of a required (or desired, or needed) change of the driving impact on the wind turbine rotor (e.g. a needed rotor torque change), in order to change a value of a rotor speed to a reference value of the rotor speed; and to determine a presence of an adjustment fault based on a comparison of the quantity with the other quantity.

Further, the arrangement may comprise an input section for receiving at least two settings of the adaptable flow regulating device and at least two settings of a blade pitch.

According to an embodiment of the present invention it is provided a wind turbine rotor blade, comprising: an adaptable flow regulating device; and an arrangement according to the preceding embodiment.

According to an embodiment of the present invention it is provided a wind turbine, comprising: a wind turbine rotor; and a wind turbine rotor blade mounted at the wind turbine rotor according to the preceding embodiment.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein:

FIG. 1 depicts a wind turbine rotor blade according to an embodiment of the present invention which comprises an adaptable flow regulating device according to an embodiment of the present invention; and FIG. 2 depicts an arrangement for detecting an adjustment fault related to a wind turbine rotor blade mounted at a wind turbine rotor and comprising an adaptable flow regulating device according to an embodiment of the present invention which is configured to carry out a method according to an embodiment of the present invention.

DETAILED DESCRIPTION

The illustration in the drawings is in schematic form.

The rotor blade 1 for a wind turbine illustrated in FIG. 1 comprises a rotor blade surface 3 which is exposed to the air flow during normal operation of the rotor blade involving rotation around a rotation axis 4 of a wind turbine. In particular, the rotor blade 1 comprises a front edge 5 and a rear (or trailing) edge 7 representing upstream edge and downstream edge, respectively, with respect to a wind direction 9.

The rotor blade 1 further comprises at least one adaptable flow regulating device 11 according to an embodiment of the present invention. The flow regulating device 11 is in the illustrated embodiment a spoiler which is installed for example at a suction side surface close to the front edge 5 of the rotor blade 1. The spoiler 11 comprises (in general the adaptable flow regulating device) comprises an airfoil surface 13 to be exposed to the air flow 9 during rotation of the rotor blade 1.

The wind turbine rotor blade 1 illustrated in FIG. 1 further comprises an arrangement 15 for detecting an adjustment fault related to the wind turbine rotor blade 1 mounted at the wind turbine rotor 4 and comprising an adaptable flow regulating device 11 according to an embodiment of the present invention. Thereby, the arrangement comprises an input section 17 which is adapted for receiving at least two settings 19a, 19b (e.g. measured by actuator and/or sensor 24) of the adaptable flow regulating device 11 and in particular also at least two settings 21a, 21b of a blade pitch which are measured for example by actuator and/or sensor 23.

The arrangement 15 is illustrated in an exemplary embodiment schematically in FIG. 2. At the input section 17, the arrangement 15 receives from the actuator and/or sensor 24 settings 19a, 19b, 19c of the flow regulating device 11. Further, the arrangement 15 receives the blade pitch angles 21a, 21b, 21c as determined by the actuator and/or sensor 23 measuring the blade pitch angles of the rotor blade 1. In particular, the blade pitch angles relate to a rotation angle of the rotor blade around a longitudinal axis 6 of the rotor blade.

As further inputs, the arrangement receives a value 25 of the rotor speed as is currently present. Furthermore, the arrangement receives a reference value 27 of the rotor speed at the input section 17. The arrangement 15 further comprises a pitch activity determination module 29 which derives from the pitch settings 21a, 21b, 21c for example a change of the pitch angles, as is indicated with reference sign 31.

Furthermore, the arrangement comprises an active add-on activity module 33 which receives the settings 19a, 19b, 19c of the adaptable flow regulating device 11 and determines a change 35 of the setting of the flow regulating device 11. Furthermore, the arrangement 15 comprises an estimation block 37 which is configured to estimate the rotor torque change (or in general a quantity) 41 based on the pitch activity change 31 and the active add-on activity change 35. The estimation block 37 therefore also receives the actual value 25 of the rotor speed. The estimation module 37 outputs the quantity 41 indicative of a change of a driving impact of wind on the wind turbine rotor, in particular indicating the torque.

A further processing module 39 is configured to determine e.g. the need of the rotor torque change rate based on the actual value 25 of the rotor speed and the reference value 27 of the rotor speed. The processing module 39 outputs the other quantity 43 indicative of a required change of the driving impact on the wind turbine rotor, in order to change a value of the rotor speed, i.e. the value 25 of the rotor speed, to the reference value 27 of the rotor speed.

The quantity 41 and the other quantity 43 are compared in a monitoring module 45 which is also comprised within the arrangement 15. If the difference between the quantity 41 and the other quantity 43 is exceeding a quantity threshold, a fault indicating signal 47 is output from the monitoring module 45 and supplied to a safety stop block 49 which may initiate or trigger a safe stop of the wind turbine.

Embodiments of the invention introduce a model-based actuator runaway protection system as is exemplarily illustrated in FIG. 2. Based on a state input from the blade pitch angle (for example blade pitch setting signals 21a, 21b, 21c) and the state of the active add-on (for example flow regulating device settings 19a, 19b, 19c) and further based on the actual value of the rotor speed 25, the actual change in rotor torque (for example labelled with reference sign 41) is estimated. This estimation, performed by the estimator block 37, may be done based on detailed data about the aerodynamic impact of the blade and active add-on or it could be based on simplified models.

The need of rotor torque change rate (for example labelled with reference sign 43 in FIG. 2) may be calculated as a function of the rotor speed 25, and the nominal or reference speed 27. The monitoring unit 45 may activate a safe stop function, if the difference between the estimated rotor torque change and the need of rotor torque change rate exceeds a threshold level. It could also be triggered if the accumulated values above the threshold level exceed an additional threshold for this accumulated value. The safe stop function (for example initiated or executed in block 49) may be either a safe pitch function or an active add-on function which may have the capacity of stopping the turbine, or a combination of these.

Embodiments of the present invention introduce active add-on states in an actuator runaway protect system. All actuators of one or more flow regulating devices may be summed or normalized to a sum of rotor torque change rate. All actuator systems may be compared by combining expected need of rotor torque change with an actual rotor torque change and activate the safe stop if they differ more than a threshold.

Advantages provided by embodiments of the present invention may be that the monitoring system can be made very narrow and slim and precise so it may capture an actuator runaway very early. This may reduce the design loads of the turbine. The monitoring unit or module 45 may for example output a signal indicating a fault, such as "actuator runaway". According to another embodiment of the present invention, a wind turbine is provided including the rotor blade illustrated in FIG. 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method of detecting an adjustment fault related to a wind turbine rotor blade mounted at a wind turbine rotor and comprising an adaptable flow regulating device, the method comprising:
    estimating a first quantity indicative of a change of a driving impact of wind on the wind turbine rotor based on at least two settings of the adaptable flow regulating device that is installed on a surface of the wind turbine rotor blade;
    determining a second quantity indicative of a desired change of the driving impact on the wind turbine rotor to change a value of a rotor speed to a reference value of the rotor speed; and
    indicating an adjustment fault based on a comparison of the first quantity with the second quantity.

2. The method according to claim 1, wherein estimating the first quantity indicative of the change of the driving impact on the wind turbine rotor is further based on at least two settings of a blade pitch of the rotor blade, and/or wherein the first quantity and/or the second quantity comprises a rotor torque.

3. The method according to claim 1, wherein the comparison of the first quantity with the second quantity includes:
    determining a quantity difference between the first quantity and the second quantity.

4. The method according to claim 1, wherein the adjustment fault is indicated:
    if an absolute value of the quantity difference exceeds a quantity threshold; and/or
    if a sum of an absolute value of the quantity difference accumulated over a time interval exceeding a quantity threshold exceeds another quantity threshold.

5. The method according to claim 1, wherein estimating the first quantity comprises:
    modelling an air flow close to and/or at the rotor blade based on the value of the rotor speed for the at least two respective settings of the adaptable flow regulating device and a blade pitch;
    deriving, based on the air flow for the different settings, an aerodynamic impact acting on the rotor blade for the at least two respective settings.

6. The method according to claim 1, wherein determining the second quantity is based on the value of the rotor speed and the rotor speed reference value.

7. The method according to claim 1, further comprising:
    measuring the at least two settings of the adaptable flow regulating device at a first time point and a second time point and determining a difference between the at least two settings; and/or
    measuring the at least two settings of the blade pitch at the first time point and the second time point and determining a difference between the at least two settings; and/or
    measuring the value of a rotor speed.

8. The method according to claim 1, wherein the at least two settings of the adaptable flow regulating device each indicates respective protrusion height and/or orientation and/or tilt of an airfoil shaped surface of the adaptable flow regulating device exposed to an air flow.

9. The method according to claim 1, wherein the at least two settings of the adaptable flow regulating device correspond to two states of the adaptable flow regulating device that differ in an effect on air flow.

10. The method according to claim 1, wherein the adaptable flow regulating device comprises a plurality of adaptable flow regulating device sections mounted at the rotor blade which are independently settable in respective states, each of the at least two settings of the adaptable flow regulating device comprising information regarding all the states.

11. The method according to claim 1, further comprising, after indicating the adjustment fault:
    triggering a safe stop function of the adaptable flow regulating device and/or a blade pitch system for stopping the wind turbine.

12. An arrangement for detecting an adjustment fault related to a wind turbine rotor blade mounted at a wind turbine rotor and comprising an adaptable flow regulating device, the arrangement comprising a processor adapted:
    to estimate a first quantity indicative of a change of a driving impact of wind on the wind turbine rotor based on at least two settings of the adaptable flow regulating device that is installed on a surface of the wind turbine rotor blade;
    to determine a second quantity indicative of a desired change of the driving impact on the wind turbine rotor to change a value of a rotor speed to a reference value of the rotor speed; and
    to determine a presence of an adjustment fault based on a comparison of the first quantity with the second quantity.

13. The arrangement according to claim 12, further comprising:
    an input section for receiving the at least two settings of the adaptable flow regulating device and at least two settings of a blade pitch.

14. A wind turbine rotor blade, comprising:

an adaptable flow regulating device; and an arrangement for detecting an adjustment fault related to the wind turbine rotor blade mounted at a wind turbine rotor and comprising an adaptable flow regulating device, the arrangement comprising a processor adapted:

to estimate a first quantity indicative of a change of a driving impact of wind on the wind turbine rotor based on at least two settings of the adaptable flow regulating device that is installed on a surface of the wind turbine rotor blade;

to determine a second quantity indicative of a desired change of the driving impact on the wind turbine rotor to change a value of a rotor speed to a reference value of the rotor speed; and to determine a presence of an adjustment fault based on a comparison of the first quantity with the second quantity.

15. A wind turbine, comprising:

a wind turbine rotor; and the wind turbine rotor blade according to claim 14, mounted at the wind turbine rotor.

16. The method of claim 1, wherein the adaptable flow regulating device is a spoiler located proximate a front edge of the wind turbine rotor blade, and includes an airfoil surface exposed to an airflow during rotation of the wind turbine rotor blade.

\* \* \* \* \*